(12) United States Patent
Lombard et al.

(10) Patent No.: US 8,684,675 B2
(45) Date of Patent: Apr. 1, 2014

(54) TURBOCHARGER WITH ANNULAR ROTARY BYPASS VALVE FOR THE TURBINE

(71) Applicant: Honeywell International Inc., Morristown, NJ (US)

(72) Inventors: Alain Lombard, Vosges (FR); Michael Ladonnet, Dombrot sur Vair (FR); Michel Thirion, Epinal (FR)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/856,759

(22) Filed: Apr. 4, 2013

(65) Prior Publication Data

US 2013/0223995 A1   Aug. 29, 2013

Related U.S. Application Data

(63) Continuation of application No. 13/741,816, filed on Jan. 15, 2013, which is a continuation of application No. 12/611,816, filed on Nov. 3, 2009, now Pat. No. 8,353,664.

(51) Int. Cl.
*F02B 37/18* (2006.01)

(52) U.S. Cl.
USPC .............................. 415/145; 415/146; 60/602

(58) Field of Classification Search
USPC .............................. 415/145, 146; 60/600, 602
See application file for complete search history.

(56) References Cited

U.S. PATENT DOCUMENTS

| | | | |
|---|---|---|---|
| 2,394,767 A | 2/1946 | Hall | |
| 3,576,102 A * | 4/1971 | West | 60/602 |
| 4,254,625 A * | 3/1981 | Bergstedt et al. | 60/602 |
| 4,336,688 A * | 6/1982 | Dellis | 60/602 |
| 4,573,800 A | 3/1986 | Lasso et al. | |
| 5,146,752 A | 9/1992 | Bruestle | |
| 5,579,643 A | 12/1996 | McEwen et al. | |
| 6,564,554 B2 * | 5/2003 | Hercey et al. | 60/602 |
| 6,983,596 B2 | 1/2006 | Frankenstein et al. | |
| 7,272,929 B2 | 9/2007 | Leavesley | |
| 2003/0029168 A1 | 2/2003 | Hercey et al. | |
| 2005/0091976 A1 | 5/2005 | Whiting | |
| 2007/0169479 A1 | 7/2007 | Nicolle et al. | |
| 2009/0183506 A1 | 7/2009 | Trombetta et al. | |
| 2009/0224190 A1 | 9/2009 | Dale et al. | |

OTHER PUBLICATIONS

International Search Report and Written Opinion for Application No. PCT/US2010/053503 dated Jul. 27, 2011.

* cited by examiner

*Primary Examiner* — Igor Kershteyn
(74) *Attorney, Agent, or Firm* — Alston & Bird LLP

(57) ABSTRACT

A turbocharger includes a turbine wheel mounted within a turbine housing and connected to a compressor wheel by a shaft. The turbine housing defines an exhaust gas inlet connected to a volute that surrounds the turbine wheel, and an axial bore through which exhaust gas that has passed through the turbine wheel is discharged from the turbine housing. The turbine housing further defines an annular bypass passage surrounding the bore and arranged to allow exhaust gas to bypass the turbine wheel. An annular bypass valve is disposed in the bypass passage. The bypass valve includes a fixed annular valve seat and a rotary annular valve member arranged coaxially with the valve seat. The valve member is disposed against the valve seat and is rotatable about the axis for selectively varying a degree of alignment between respective orifices in the valve seat and valve member.

16 Claims, 13 Drawing Sheets

TURBOCHARGER WITH ANNULAR ROTARY BYPASS VALVE FOR THE TURBINE

CROSS REFERENCE TO RELATED APPLICATIONS

This application is a continuation of U.S. application Ser. No. 13/741,816 filed Jan. 15, 2013, which is a continuation of U.S. application Ser. No. 12/611,816 filed Nov. 3, 2009, the entire contents of which are incorporated herein by reference.

BACKGROUND OF THE INVENTION

The present disclosure relates to exhaust gas-driven turbochargers, and particularly to bypass arrangements that allow exhaust gas to bypass the turbine under certain engine operating conditions.

In a conventional turbocharger, the turbine housing defines a bypass conduit located generally to one side of the main bore through the housing, and the bypass conduit is connected to the exhaust gas inlet or the volute of the housing via a bypass valve. The bypass valve typically is a swing or poppet style valve comprising a circular valve member that is urged against a flat valve seat surrounding the bypass passage opening. The valve usually is arranged such that the exhaust gas pressure acts on the valve member in a direction tending to open the valve. One drawback associated with such an arrangement is that it is difficult to completely seal the valve in the closed position, since gas pressure tends to open the valve. Leakage past the closed bypass valve is a cause of performance degradation of the turbine and, hence, the turbocharger and its associated engine. The typical solution to the leakage issue is to preload the bypass valve member against the valve seat, but often this does not fully eliminate leakage, and in any event it causes additional problems such as an increase in the required actuation force for opening the valve.

Furthermore, swing or poppet valves tend to be poor in terms of controllability, especially at the crack-open point, and it is common for the bypass flow rate to be highly non-linear with valve position, which makes it very difficult to properly regulate the bypass flow rate. This leads to problems such as poor transient response of the turbocharger and engine system.

BRIEF SUMMARY OF THE DISCLOSURE

The present disclosure describes various embodiments of turbochargers having a novel bypass arrangement that seeks to address issues such as the ones noted above. In one embodiment, a turbocharger comprises a compressor wheel mounted within a compressor housing, and a turbine wheel mounted within a turbine housing and connected to the compressor wheel by a shaft. The turbine housing defines an exhaust gas inlet connected to a volute that surrounds the turbine wheel, the turbine housing further defining an axial bore through which exhaust gas that has passed through the turbine wheel is discharged from the turbine housing. The turbine housing further defines an annular bypass passage surrounding the bore and arranged to allow exhaust gas to bypass the turbine wheel. An annular bypass valve is disposed in the bypass passage. The bypass valve comprises a fixed valve seat of annular form and a rotary valve member of annular form arranged coaxially with the valve seat relative to an axis. The valve member is disposed against the valve seat and is rotatable about the axis for selectively varying a degree of alignment between respective orifices in the valve seat and valve member, ranging from no alignment defining a closed condition of the bypass valve, to at least partial alignment defining an open condition of the bypass valve.

An advantage of this bypass arrangement is that exhaust gas pressure acts on the valve in a direction tending to improve, rather than hinder, sealing, in contrast to the aforementioned swing and poppet style bypass valve arrangements.

A further advantage is that the valve can achieve better controllability than is typically possible with swing or poppet valves, particularly at the crack-open point.

In a particular embodiment, the valve member defines a plurality of first orifices therethrough, the valve seat defines a plurality of second orifices therethrough, and each first orifice has a corresponding second orifice.

The valve member in one embodiment is a generally flat annular disk and the first orifices are circumferentially spaced apart about a circumference of the valve member. Similarly, the valve seat is a generally flat annular disk having the second orifices circumferentially spaced apart in correspondence with the first orifices, and there is sufficient circumferential distance between adjacent second orifices to accommodate the first orifices therebetween in the closed condition of the bypass valve.

The valve can include features facilitating sealing between the valve member and valve seat. In one embodiment, either the valve member or the valve seat includes raised pads surrounding the respective first or second orifices therein, and the pads are in contact with a substantially planar surface of the other of the valve member and the valve seat so as to provide sealing between the valve member and the valve seat.

The orifices can have various shapes, including circular or non-circular. In one embodiment, the first and second orifices are longer in the radial direction than in the circumferential direction. The orifices can be circumferentially spaced uniformly or non-uniformly.

The turbocharger also includes a drive system for effecting the needed rotational movement of the valve member. In one embodiment, the drive system includes a rotary drive member penetrating through the turbine housing in a direction generally transverse to the axis about which the valve member rotates, and a drive arm attached to a distal end of the rotary drive member. A distal end of the drive arm engages the valve member such that rotation of the rotary drive member causes the drive arm to rotate the valve member about the axis. The drive system can further comprise a link attached to a proximal end of the rotary drive member, and a linear actuator having an actuator rod, the actuator being operable to extend and retract the actuator rod. A distal end of the actuator rod is connected to the link such that extension of the actuator rod causes the link to rotate the rotary drive member in one direction and retraction of the actuator rod causes the link to rotate the rotary drive member in the opposite direction.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
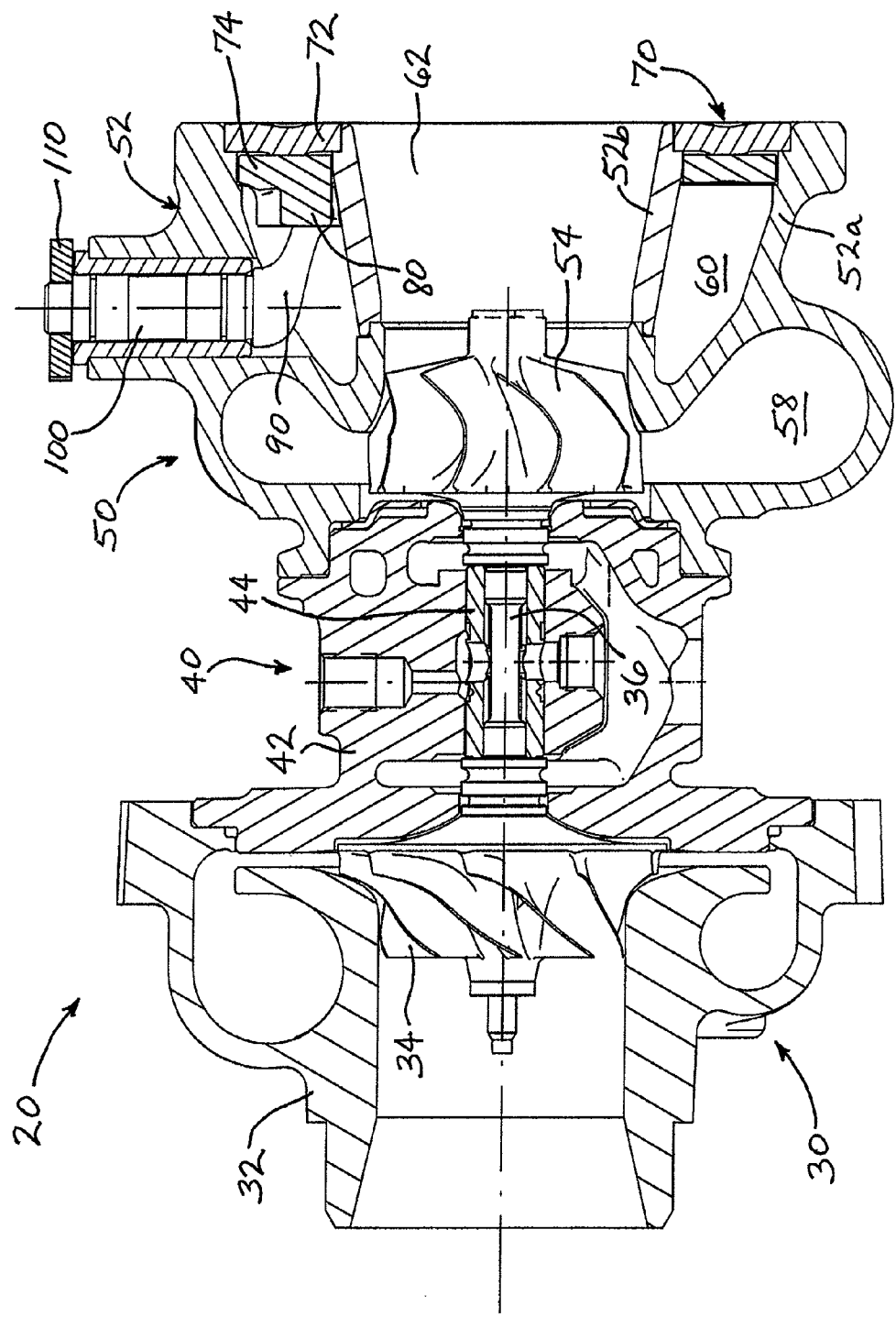
FIG. 1 is an axial cross-sectional view of a turbocharger in accordance with one embodiment of the present invention.
Figure 2:
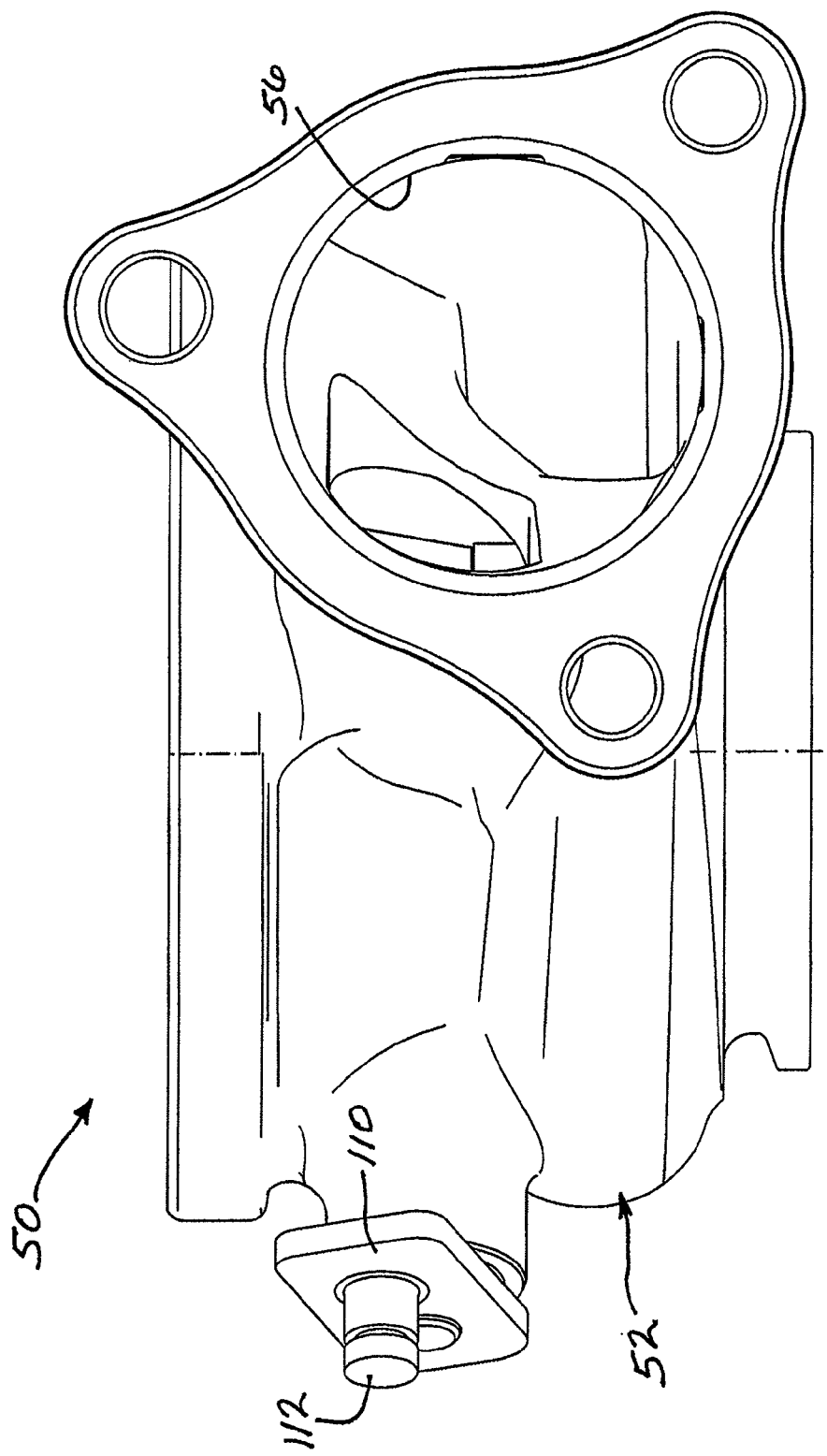
FIG. 2 is a side view of the turbine assembly for the turbocharger of FIG. 1.
Figure 3:
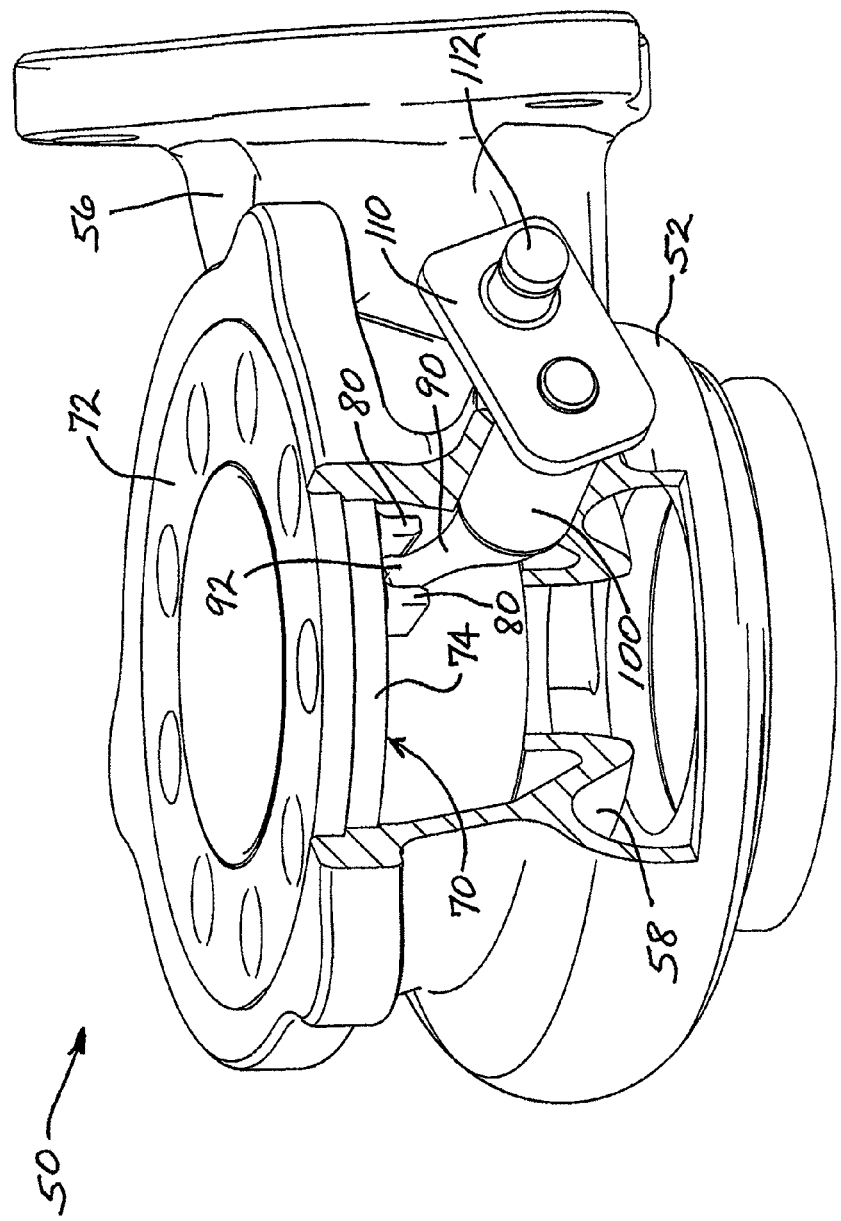
FIG. 3 is a perspective view of the turbine assembly of FIG. 2, wherein the turbine housing is shown partly cut away to reveal internal details.

A turbocharger 20 in accordance with one embodiment of the present invention is shown in axial cross-sectional view in FIG. 1, and various views of a turbine assembly for the turbocharger and components of the turbine assembly are depicted in FIGS. 2-13. As shown in FIG. 1, major subassemblies of the turbocharger 20 include a compressor assembly 30, a center housing assembly 40, and a turbine assembly 50. The compressor assembly 30 includes a compressor housing 32 and a compressor wheel 34 mounted therein and attached to one end of a rotary shaft 36. The center housing assembly 40 includes a center housing 42 that is affixed to the compressor housing 32 and that contains bearings 44 for the rotary shaft 36. The turbine assembly 50 includes a turbine housing 52 and a turbine wheel 54 mounted therein and attached to the opposite end of the rotary shaft 36.

The turbine housing 52 defines an exhaust gas inlet 56 through which exhaust gas from an internal combustion engine is received, and a volute 58 that receives the exhaust gas from the inlet 56 and distributes the gas around the 360° volute for feeding into the turbine wheel 54. The exhaust gas inlet 56 is also open to a generally annular bypass passage 60 defined in the turbine housing 52. The bypass passage 60 surrounds an axial bore 62 defined in the turbine housing. Exhaust gas that has passed through the turbine wheel 54 is exhausted from the turbine housing through the bore 62. The bypass passage 60 provides an alternative pathway for exhaust gas to flow without first having to pass through the turbine wheel 54.

An annular bypass valve 70 is installed in the bypass passage 60 for regulating flow through the bypass passage. With primary reference to FIGS. 3-9, the major components of the annular bypass valve 70 include a stationary valve seat 72 and a rotary valve member 74 in abutting engagement with the valve seat. The valve seat 72 and valve member 74 are arranged between an annular outer portion 52a of the turbine housing 52 and an annular inner member 52b. As shown, the inner member 52b is formed separately from the turbine housing 52 and is connected with an integral portion of the turbine housing, but in other embodiments the inner member can be an integral part of the turbine housing. The outer portion 52a and inner member 52b together define an annular space for receiving the valve member 74 and the valve seat 72. The valve member 74 is prevented from moving axially upstream by a shoulder defined by the outer portion 52a of the turbine housing, although during operation pressure of the exhaust gas urges the valve member 74 in the downstream direction. The valve member 74 is not constrained by the turbine housing but is free to rotate about its axis and to move axially against the valve seat 72. The valve seat 72 is prevented from moving axially, radially, or rotationally. A radially outer edge portion of the upstream face of the valve seat 72 (i.e., the left-hand face in FIG. 5) abuts a shoulder defined by the outer portion 52a of the turbine housing, and the radially inner edge portion of the upstream face abuts a shoulder defined by the inner member 52b, thereby putting the valve seat in a precise axial location as dictated by these shoulders.

The valve seat 72 (best illustrated in FIGS. 7 and 8) is a generally flat ring-shaped or annular member having a plurality of orifices 73 circumferentially spaced apart about a circumference of the valve seat, the orifices 73 extending generally axially between the upstream and downstream faces of the valve seat. The orifices 73 in the illustrated embodiment are uniformly spaced about the circumference of the valve seat, but as further described below, non-uniform spacing of the orifices is also possible and can be advantageous in some circumstances.

The rotary valve member 74 (best illustrated in FIG. 9) is a generally flat ring-shaped or annular member having a plurality of orifices 75 circumferentially spaced apart about a circumference of the valve seat, the orifices 75 extending generally axially between the upstream and downstream faces of the valve member. The orifices 75 in the illustrated embodiment are uniformly spaced about the circumference of the valve member, and the number and spacing of the orifices 75 in the valve member are the same as the number and spacing of the orifices 73 in the valve seat. However, as further described below, non-uniform spacing of the orifices 75 is also possible and can be advantageous in some circumstances; furthermore, the spacings of the orifices 73 and 75 do not have to be the same, and in some cases it can be advantageous for the spacings to be different. The valve member 74 has a substantially circular cylindrical outer edge 76 and a substantially circular cylindrical inner edge 78, the outer and inner edges 76, 78 being coaxial with respect to a central longitudinal axis of the valve member, which axis is also substantially coincident with a central longitudinal axis of the valve seat 72. The outer portion 52a of the turbine housing and the inner member 52b both define substantially circular bearing surfaces for the outer and inner edges 76, 78 of the rotary valve member 74 and there are clearances therebetween, so that the valve member can be rotated in one direction or the opposite direction about its central longitudinal axis in order to vary a degree of alignment between the valve member orifices 75 and the valve seat orifices 73, as further described below.

The valve member 74 further defines a fork or yoke comprising a pair of projections 80 that project axially from the upstream face of the valve member. The projections 80 are circumferentially spaced apart by a small distance sufficient to accommodate the distal end 92 of an L-shaped drive arm 90 that is rigidly affixed to a distal (radially inner) end of a rotary drive member 100. The rotary drive member 100 penetrates substantially radially through the turbine housing 52 via a bore 53 (see FIGS. 5 and 6) that connects with the generally annular bypass passage 60. The proximal (radially outer) end of the rotary drive member 100 is located outside the turbine housing 52 and is rigidly affixed to a link 110. The link 110 has a connecting member 112 (FIGS. 2 and 3) that is offset from the rotation axis of the rotary drive member 100 and that can be coupled to an actuator rod of an actuator (not shown) such that extension of the actuator rod causes the link 110 to rotate the rotary drive member 100 in one direction and retraction of the actuator rod causes the link to rotate the rotary drive member in the opposite direction. As a result, the drive arm 90 affixed to the distal end of the rotary drive member 100 in turn causes the valve member 74 to be rotated in one direction or the opposite direction about its axis.

Figure 4:
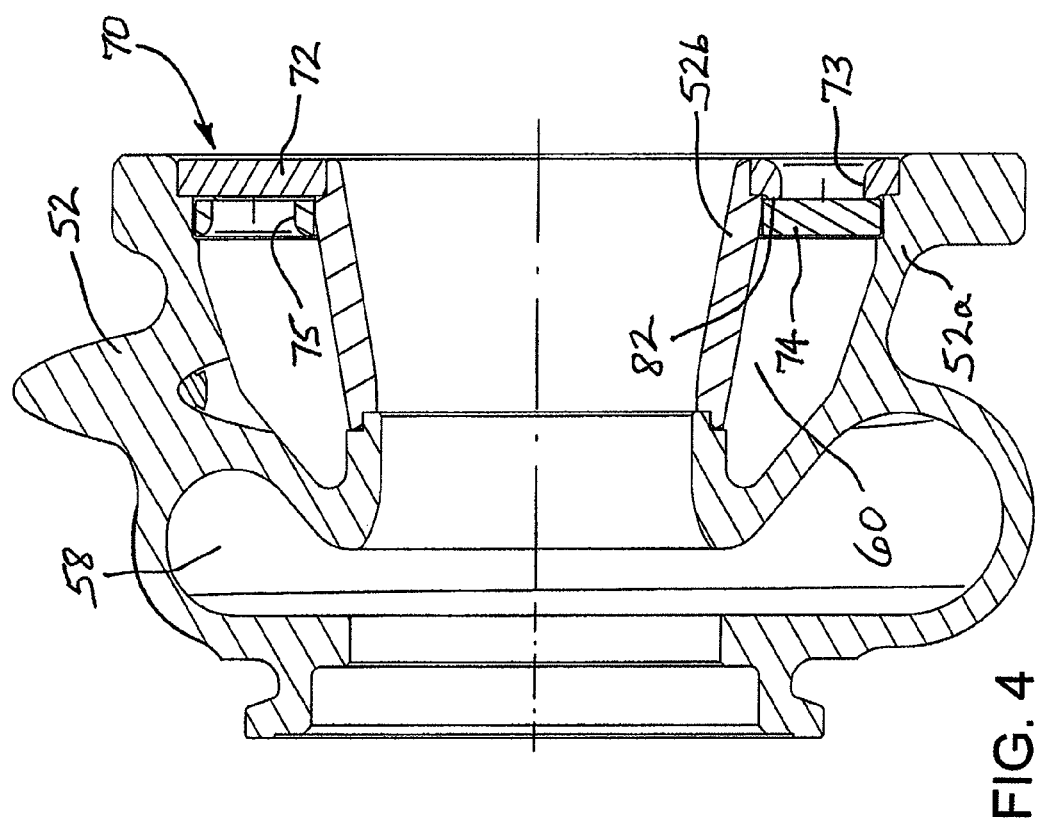
FIG. 4 is an axial cross-sectional view of the turbine assembly of FIG. 1 on a first axial plane.
Figure 5:
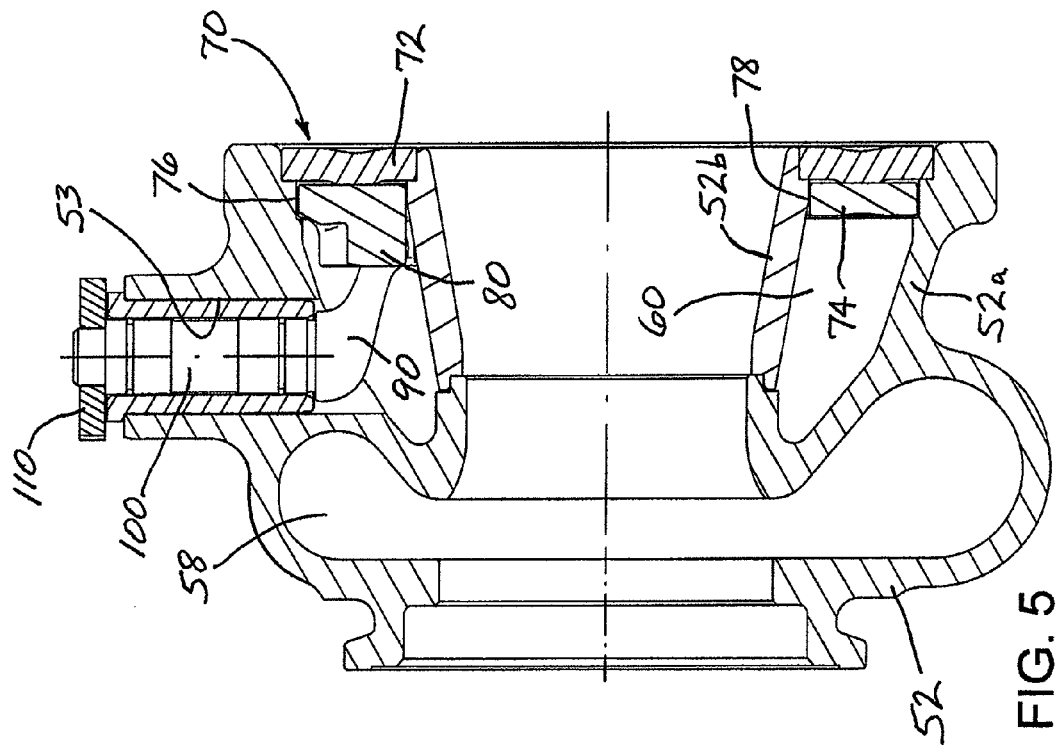
FIG. 5 is an axial cross-sectional view of the turbine assembly of FIG. 1 on a second axial plane.
Figure 6:
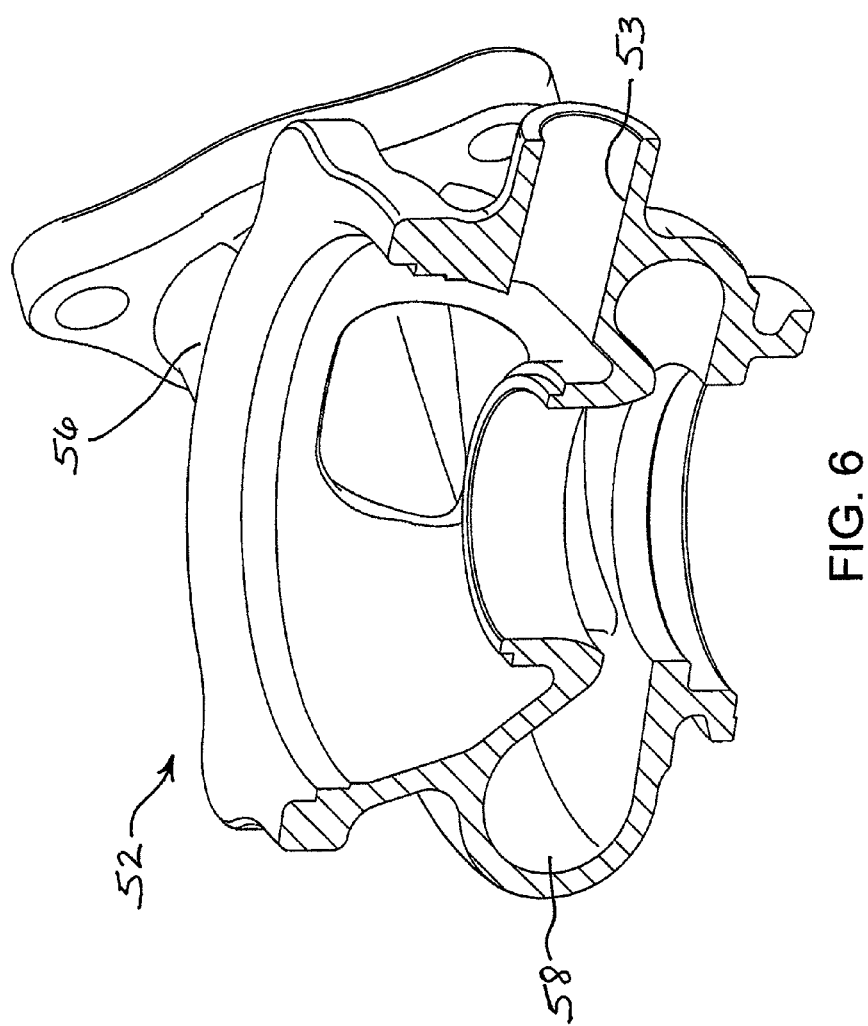
FIG. 6 is an axially sectioned perspective view of the turbine housing for the turbocharger of FIG. 1.
Figure 7:
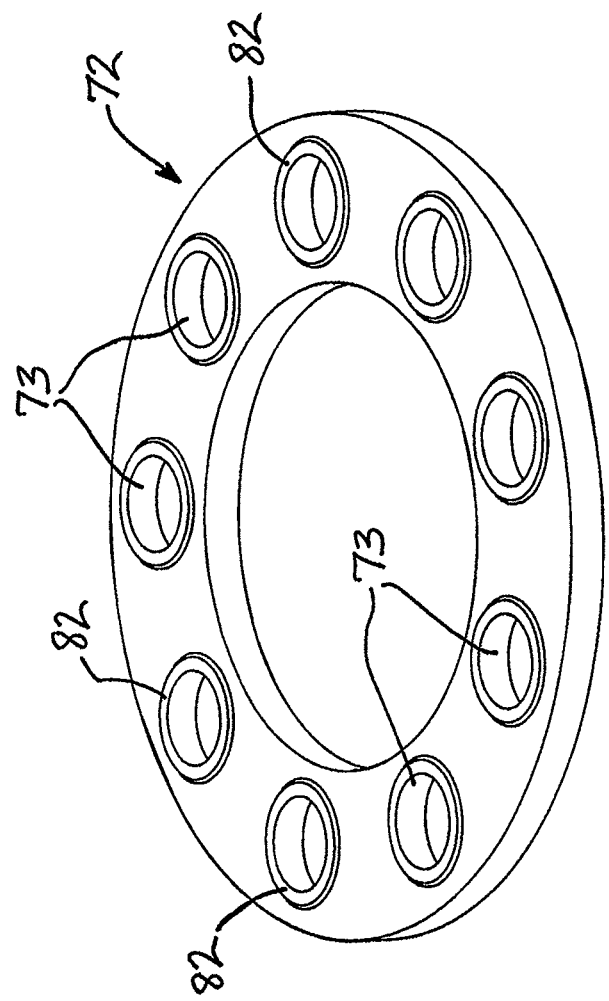
FIG. 7 is a perspective view of the valve seat for the annular bypass valve of the turbocharger of FIG. 1.
Figure 8:
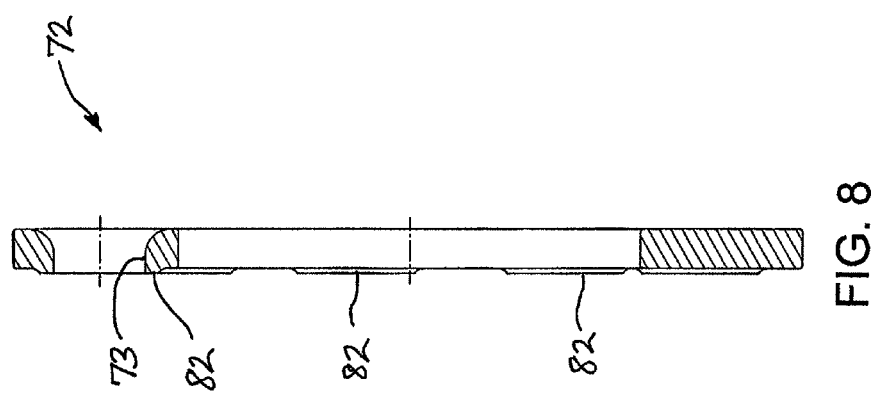
FIG. 8 is an axial cross-sectional view of the valve seat of FIG. 7.
Figure 9:
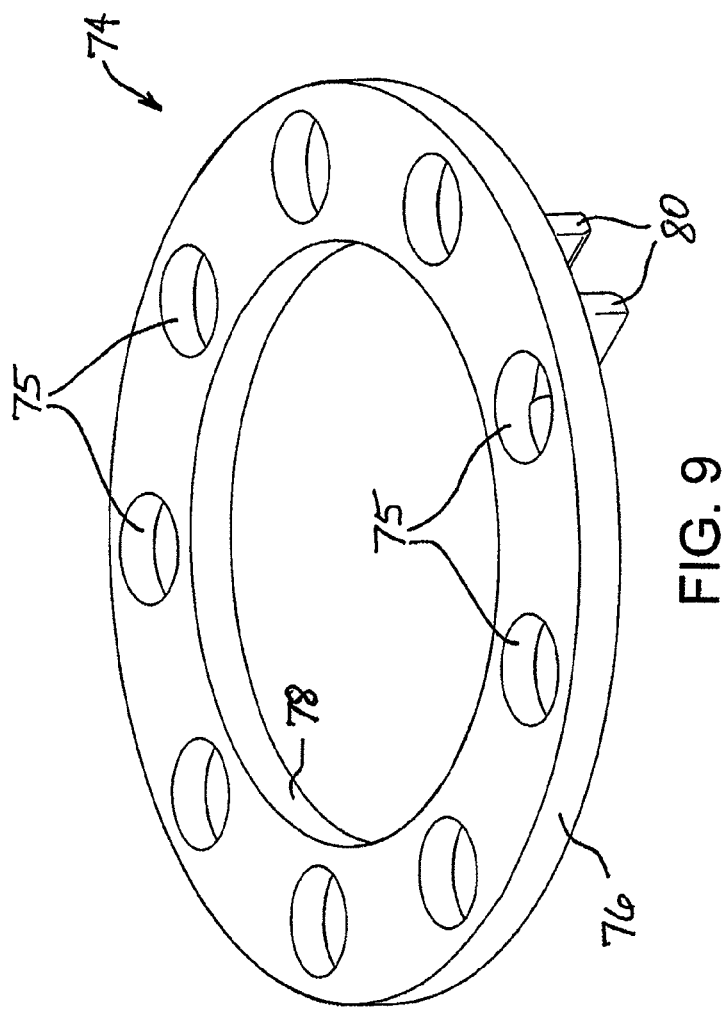
FIG. 9 is a perspective view of the rotary valve member for the annular bypass valve of the turbocharger of FIG. 1.

With reference particularly to FIGS. 4, 7, and 8, each of the orifices 73 in the valve seat 72 has a raised pad 82 surrounding it. The pads 82 abut the planar face of the valve member 74 (FIG. 4) and serve as seals to help seal the interface between the valve member and valve seat. The provision of the raised pads 82 reduces the total surface area of the valve seat 72 in frictional contact with the rotary valve member 74, thereby reducing the total friction forces that the actuation system must overcome to rotate the valve member.

Figure 10:
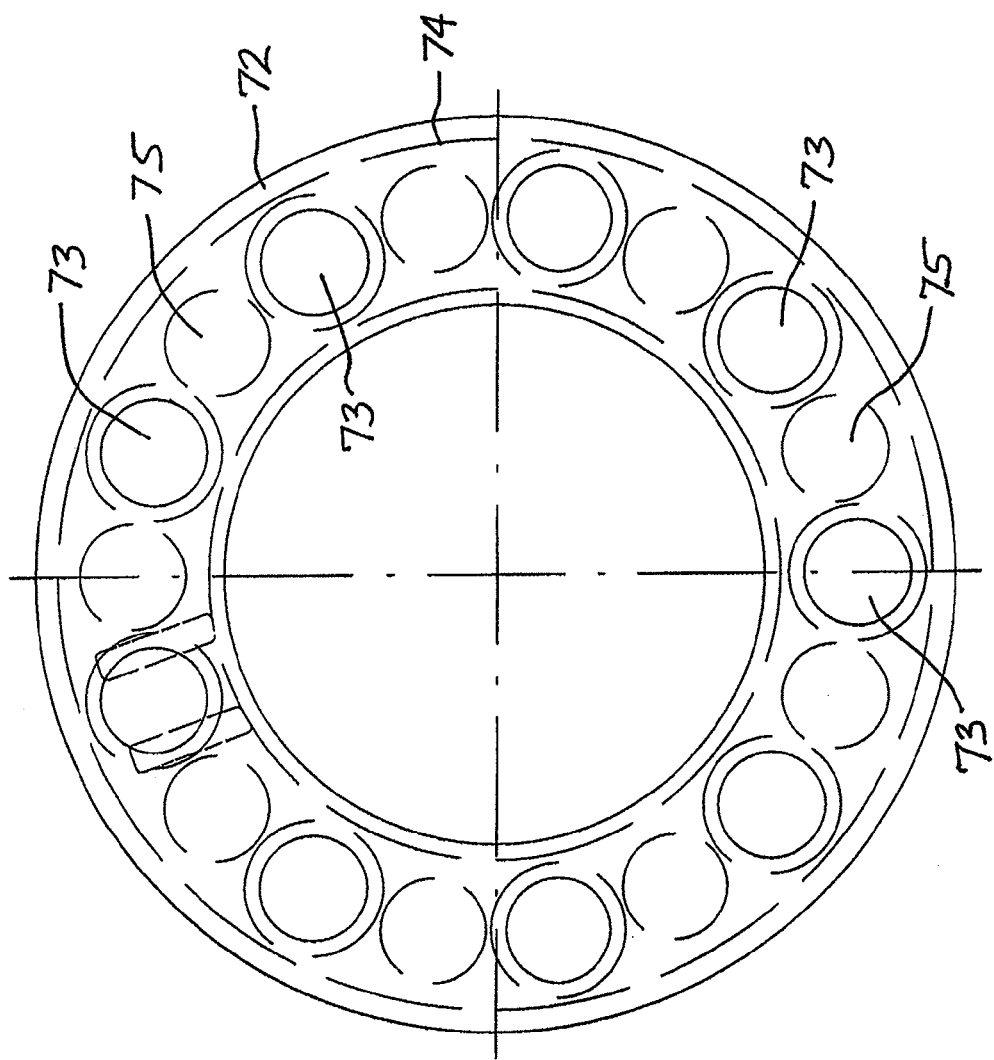
FIG. 10 is an axial view of the annular bypass valve, as viewed from a position downstream of the valve looking axially upstream, showing the valve in a closed position.

FIGS. 10-13 illustrate the various positions of the bypass valve 70 for regulating bypass flow. In FIG. 10, the valve member 74 is positioned such that each of its orifices 75 is located between two adjacent orifices 73 in the valve seat 72, and there is sufficient circumferential distance between adjacent orifices 73 to accommodate an orifice 75 with no overlap therebetween. Thus, the position of FIG. 10 represents a closed position of the bypass valve in which essentially no exhaust gas can pass through the bypass passage 60 (except perhaps for a very small leakage flow of no appreciable consequence).

Figure 11:
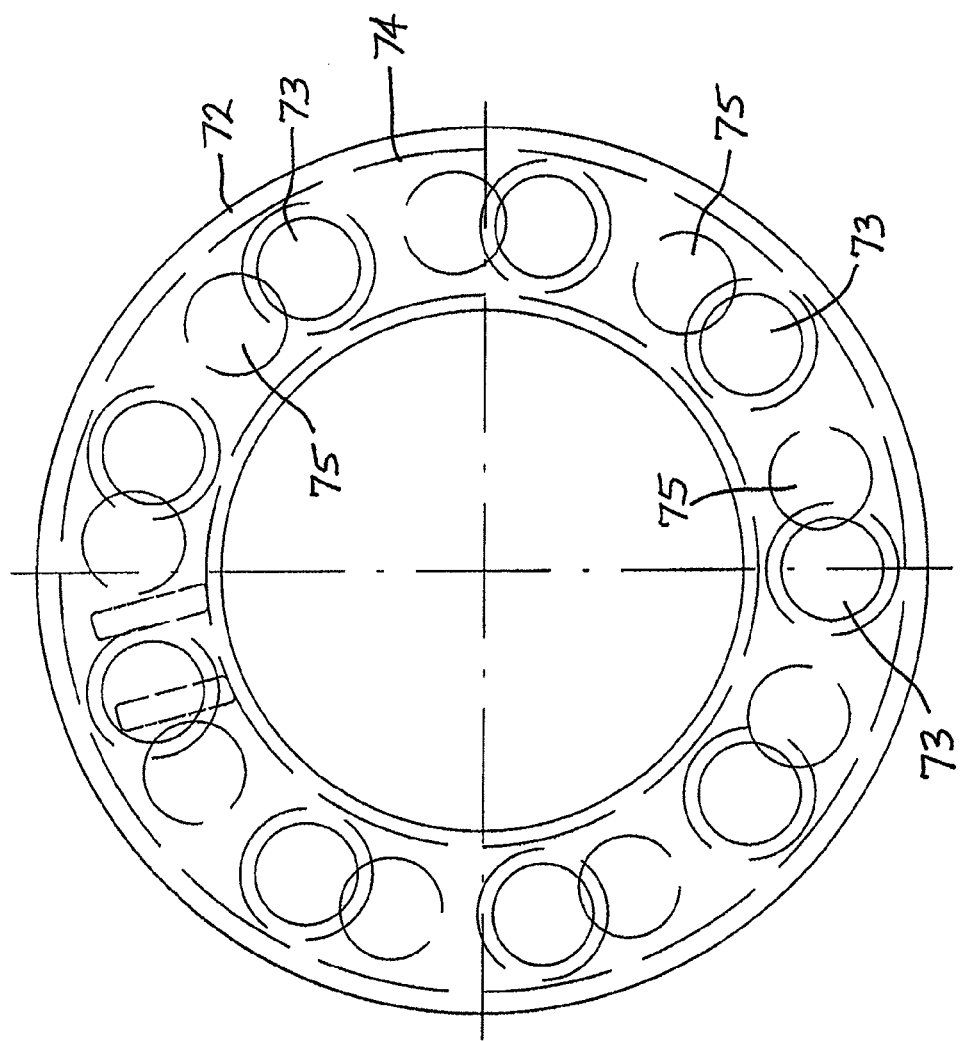
FIG. 11 is a view similar to FIG. 10, showing the valve when it has just been cracked open by rotation of the rotary valve member.

FIG. 11 shows the valve in a "crack-open" position in which the valve member 74 has been rotated a small amount clockwise relative to FIG. 10 such that there just begins to be some overlap between the orifices 75 and the orifices 73.

Figure 12:
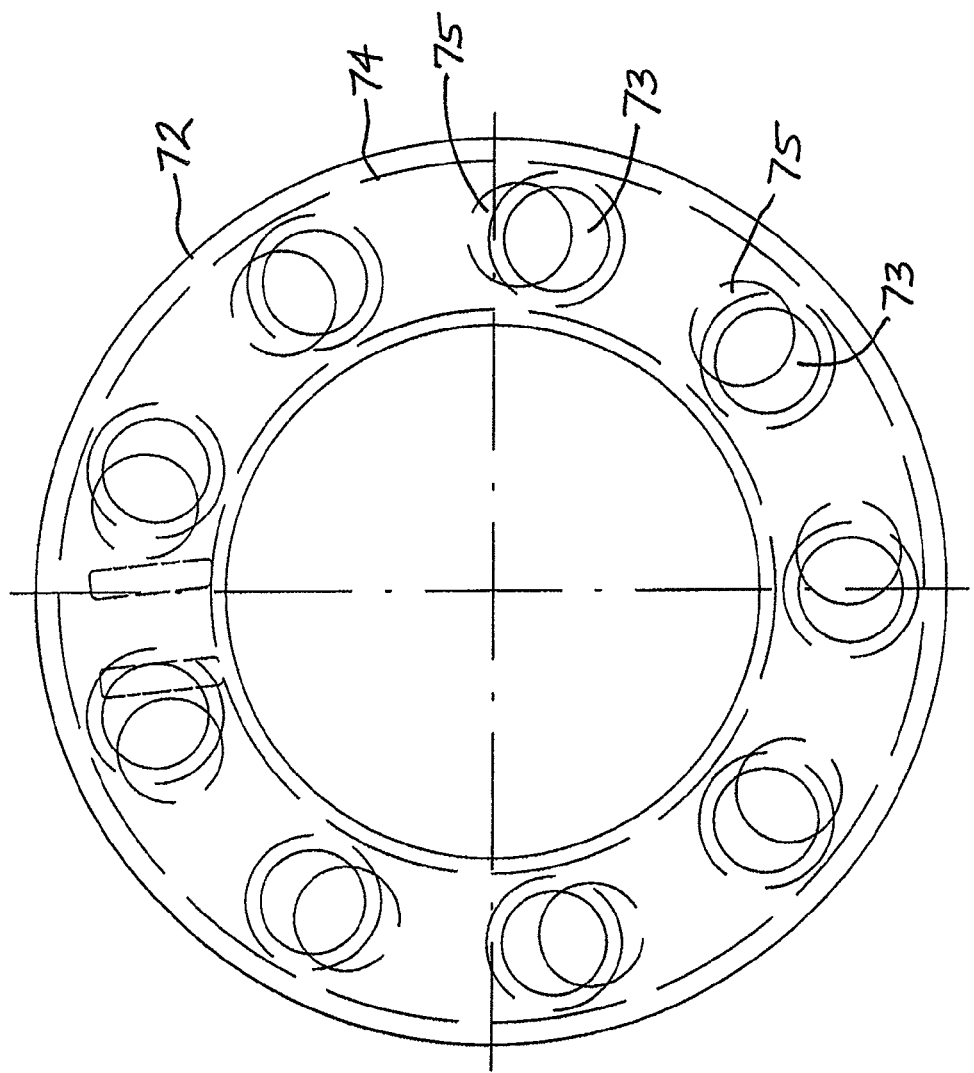
FIG. 12 is a view similar to FIG. 10, showing the valve in a partially open position after further rotation of the valve member.

With further clockwise rotation of the valve member 74 from the position of FIG. 11, a greater degree of overlap exists between the orifices 75 and 73, as shown in the "partially open" position of FIG. 12.

Figure 13:
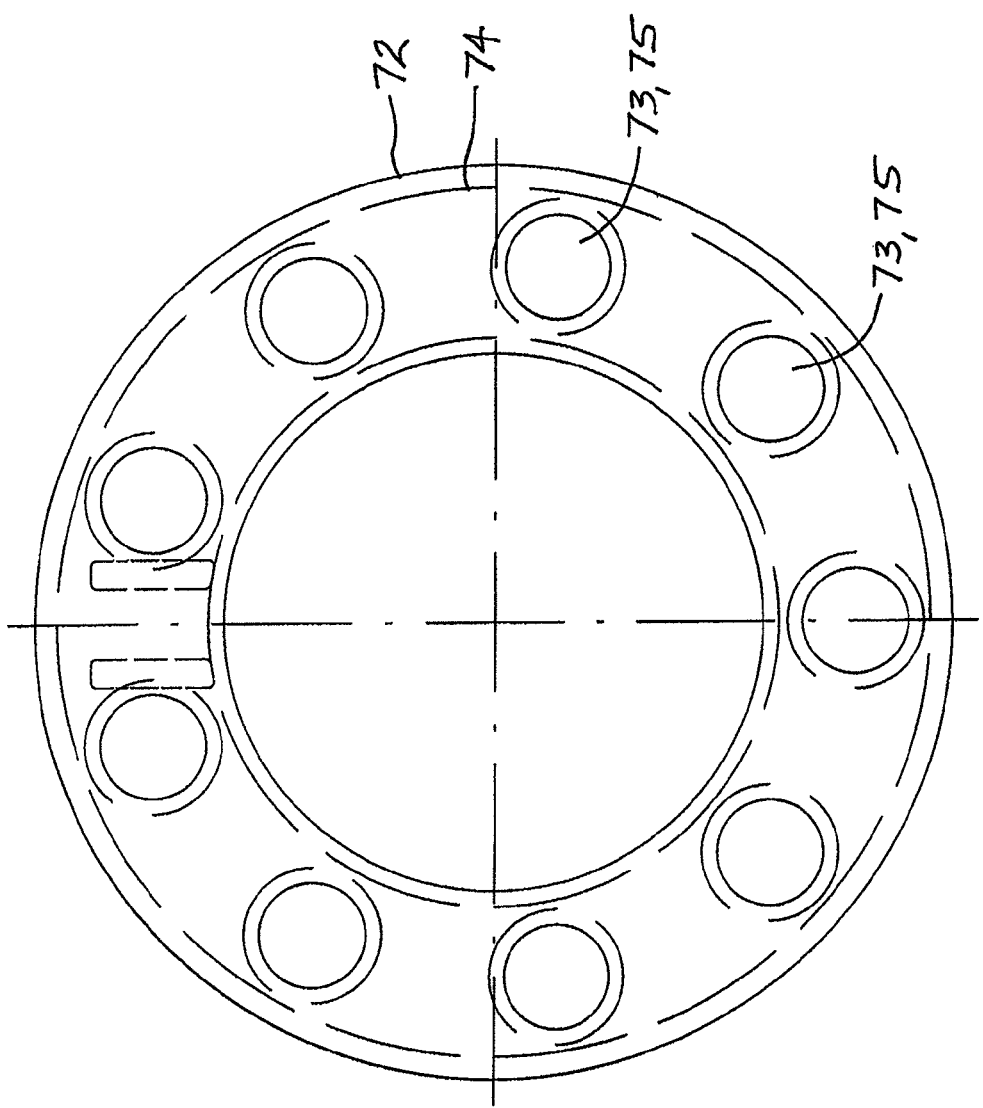
FIG. 13 is a view similar to FIG. 10, showing the valve in a fully open position after further rotation of the valve member.

FIG. 13 shows a fully open position of the valve, in which the maximum possible overlap exists between the orifices 75 and 73.

With the described annular bypass valve 70, exhaust gas pressure acts on the valve member 74 in a direction toward the fixed valve seat 72, thereby tending to improve sealing between the valve member and valve seat. Furthermore, the gas pressure does not tend to open the valve, in contrast to the aforementioned swing and poppet style bypass valve arrangements in which gas pressure acts in a direction tending to open the valve and cause leakage. The improved sealing made possible by the valve 70 is thought to be significant because it can improve the transient response time of the turbocharger, by making better use of instantaneous engine pulses in the exhaust gas stream, especially at low engine speeds and gas flow rates where the pulse impact is most significant in regard to turbine efficiency.

A further advantage is that the valve 70 can achieve better controllability than is typically possible with swing or poppet valves, particularly at the crack-open point. In particular, the evolution of the shape and size of the flow passages through the valve as the valve member 74 is rotated can be tailored to the needs of a particular application simply by suitably configuring the sizes, angular locations (e.g., whether uniformly or non-uniformly spaced apart), and shapes of the orifices in the valve member and valve seat. Thus, while the orifices 73, 75 are shown as being circular in the drawings, alternatively they can be made non-circular as a way of altering the evolution of the flow passages as the valve opens. For example, the orifices could be made generally rectangular with their edges extending generally radially (possibly with a larger dimension in the radial direction than in the circumferential direction), which would result in a greater change in flow passage size per degree of valve member rotation, in comparison with the circular orifice shape.

As another example of the fine-tuning of the evolution of the valve flow passages made possible by the invention, the valve seat orifices 73 could have a first circumferential spacing (e.g., uniform) about the circumference, and the valve member orifices 75 could have a second circumferential spacing (e.g., non-uniform) different from the first circumferential spacing. It is further possible (though not essential) in such an embodiment for the orifices 73, 75 to be of different sizes and/or shapes. This could result in, for example, one flow passage (or some other subset of the total number of flow passages) beginning to open before any of the other flow passages begin to open, thereby achieving a very gradual cracking open of the bypass valve. Further rotation of the valve member 74 would then cause the other flow passages to open (perhaps in a sequential or staged fashion, e.g., one flow passage opening at a time until finally all flow passages are open). These are merely some examples of the many different ways the orifices can be configured so as to achieve a desired flow passage evolution as a function of valve member rotation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger comprising:
a compressor wheel mounted within a compressor housing;
a turbine wheel mounted within a turbine housing and connected to the compressor wheel by a shaft;
the turbine housing defining an exhaust gas inlet connected to a volute that surrounds the turbine wheel, the turbine housing further defining an axial bore through which exhaust gas that has passed through the turbine wheel is discharged from the turbine housing;
the turbine housing defining an annular bypass passage surrounding the bore and arranged to allow exhaust gas to bypass the turbine wheel; and
an annular bypass valve disposed in the bypass passage, the bypass valve comprising a fixed annular valve seat and a rotary annular valve member arranged coaxially with the valve seat relative to an axis, the valve member being disposed against the valve seat and being rotatable about the axis;

the valve member defining a plurality of first orifices therethrough, and the valve seat defining a plurality of second orifices therethrough, the first orifices having a first circumferential spacing therebetween and the second orifices having a second circumferential spacing therebetween, wherein the first circumferential spacing is different from the second circumferential spacing, and wherein at least partial alignment between one of the first orifices and a corresponding one of the second orifices creates a flow passage for flow of exhaust gas therethrough;

rotation of the valve member about the axis causing variation in a degree of alignment between the first orifices defined through the valve member and the second orifices defined through the valve seat, ranging from no alignment defining a closed condition of the bypass valve, to at least partial alignment defining an open condition of the bypass valve.

2. The turbocharger of claim 1, wherein the first and second orifices are configured and arranged such that one subset of all flow passages begins to open before any of the other flow passages begin to open.

3. The turbocharger of claim 2, wherein the first and second orifices are configured and arranged such that one flow passage opens at a time, until finally all flow passages are open.

4. The turbocharger of claim 1, wherein the valve member is a generally flat annular disk having the first orifices circumferentially spaced apart about a circumference of the valve member, and the valve seat is a generally flat annular disk having the second orifices circumferentially spaced apart about a circumference of the valve seat, there being sufficient circumferential distance between adjacent second orifices to accommodate the first orifices therebetween in the closed condition of the bypass valve.

5. The turbocharger of claim 4, wherein one of the valve member and the valve seat includes raised pads surrounding the respective first or second orifices therein, the pads being in contact with a substantially planar surface of the other of the valve member and the valve seat so as to provide sealing between the valve member and the valve seat.

6. The turbocharger of claim 1, wherein the first and second orifices are circular.

7. The turbocharger of claim 1, wherein the first and second orifices are non-circular.

8. The turbocharger of claim 7, wherein the first and second orifices are longer in a radial direction than in a circumferential direction.

9. The turbocharger of claim 1, further comprising a rotary drive member penetrating through the turbine housing in a direction generally transverse to the axis about which the valve member rotates, and a drive arm attached to a distal end of the rotary drive member, a distal end of the drive arm engaging the valve member such that rotation of the rotary drive member causes the drive arm to rotate the valve member about the axis.

10. The turbocharger of claim 9, further comprising a link attached to a proximal end of the rotary drive member, and an actuator having an actuator rod, the actuator being operable to extend and retract the actuator rod, a distal end of the actuator rod being connected to the link such that extension of the actuator rod causes the link to rotate the rotary drive member in one direction and retraction of the actuator rod causes the link to rotate the rotary drive member in the opposite direction.

11. A turbine assembly for a turbocharger, comprising:
a turbine housing;
a turbine wheel rotatably mounted in the turbine housing;
the turbine housing defining an exhaust gas inlet connected to a volute that surrounds the turbine wheel, the turbine housing further defining an axial bore through which exhaust gas that has passed through the turbine wheel is discharged from the turbine housing;
the turbine housing defining an annular bypass passage surrounding the bore and arranged to allow exhaust gas to bypass the turbine wheel; and
an annular bypass valve disposed in the bypass passage, the bypass valve comprising a fixed annular valve seat and a rotary annular valve member arranged coaxially with the valve seat relative to an axis, the valve member being disposed against the valve seat and being rotatable about the axis, the valve member defining a plurality of first orifices therethrough, and the valve seat defining a plurality of second orifices therethrough, the first orifices having a first circumferential spacing therebetween and the second orifices having a second circumferential spacing therebetween, wherein the first circumferential spacing is different from the second circumferential spacing, and wherein at least partial alignment between one of the first orifices and a corresponding one of the second orifices creates a flow passage for flow of exhaust gas therethrough;

rotation of the valve member about the axis causing variation in a degree of alignment between the first orifices defined through the valve member and the second orifices defined through the valve seat, ranging from no alignment defining a closed condition of the bypass valve, to at least partial alignment defining an open condition of the bypass valve.

12. The turbine assembly of claim 11, wherein the first and second orifices are configured and arranged such that one subset of all flow passages begins to open before any of the other flow passages begin to open.

13. The turbine assembly of claim 12, wherein the first and second orifices are configured and arranged such that one flow passage opens at a time, until finally all flow passages are open.

14. The turbine assembly of claim 11, wherein the valve member is a generally flat annular disk having the first orifices circumferentially spaced apart about a circumference of the valve member, and the valve seat is a generally flat annular disk having the second orifices circumferentially spaced apart about a circumference of the valve seat, there being sufficient circumferential distance between adjacent second orifices to accommodate the first orifices therebetween in the closed condition of the bypass valve.

15. The turbine assembly of claim 14, wherein one of the valve member and the valve seat includes raised pads surrounding the respective first or second orifices therein, the pads being in contact with a substantially planar surface of the other of the valve member and the valve seat so as to provide sealing between the valve member and the valve seat.

16. The turbine assembly of claim 11, further comprising a rotary drive member penetrating through the turbine housing in a direction generally transverse to the axis about which the valve member rotates, and a drive arm attached to a distal end of the rotary drive member, a distal end of the drive arm engaging the valve member such that rotation of the rotary drive member causes the drive arm to rotate the valve member about the axis.

* * * * *